United States Patent [19]

Lee

[11] Patent Number: 5,445,044

[45] Date of Patent: Aug. 29, 1995

[54] CLUTCHLESS MECHANICAL GEAR TRANSMISSION

[75] Inventor: Gary D. Lee, Woodland Hills, Utah

[73] Assignee: The Anchored Corporation, Woodland Hills, Utah

[21] Appl. No.: 66,663

[22] Filed: May 25, 1993

[51] Int. Cl.$^6$ .......................................... F16H 3/083
[52] U.S. Cl. ..................................................... 74/372
[58] Field of Search ........................ 74/370, 371, 372

[56] References Cited

U.S. PATENT DOCUMENTS

| | | |
|---|---|---|
| 501,381 | 7/1893 | Taylor . |
| 683,003 | 9/1901 | Schellenbach . |
| 735,068 | 8/1903 | Curtis ................................. 74/371 |
| 921,522 | 5/1909 | Dunkel . |
| 965,461 | 7/1910 | Holland . |
| 1,015,254 | 1/1912 | Whisler ............................... 74/372 |
| 1,099,587 | 6/1914 | Bugatti ................................ 74/372 |
| 1,102,427 | 7/1914 | Morgan ............................... 74/372 |
| 1,189,136 | 6/1916 | Kirchhoff . |
| 1,597,944 | 8/1926 | Wilson ................................ 74/372 |
| 1,661,892 | 3/1928 | Girones . |
| 1,740,725 | 12/1929 | Brown . |
| 2,045,835 | 6/1936 | Coen . |
| 2,103,959 | 12/1937 | Spinner ............................... 74/372 |
| 2,168,322 | 8/1939 | Butler ................................. 74/371 |
| 2,320,960 | 6/1943 | Wheaton . |
| 2,426,154 | 2/1947 | Chilton . |
| 2,505,464 | 4/1950 | Debuit . |
| 2,590,232 | 3/1952 | Chilton . |
| 2,592,982 | 4/1952 | Violet ................................. 74/372 |
| 2,807,965 | 10/1957 | Frank . |
| 2,861,461 | 11/1958 | Kreidler .............................. 74/371 |
| 3,028,763 | 4/1962 | Vetsch . |
| 3,067,626 | 12/1962 | Doerries et al. ..................... 74/372 |
| 3,154,962 | 11/1964 | Mukherjee . |
| 3,463,028 | 8/1969 | Polidor . |
| 3,662,613 | 5/1972 | Ingalls . |
| 3,686,957 | 8/1972 | Kim et al. . |
| 3,691,861 | 9/1972 | Stürmer .............................. 74/330 |
| 3,707,884 | 1/1973 | Go . |
| 3,812,735 | 5/1974 | Von Kaler et al. . |
| 4,088,037 | 5/1978 | Carr . |
| 4,141,424 | 2/1979 | Murayama et al. .................. 74/372 |
| 4,292,855 | 10/1981 | Murayama . |
| 4,343,612 | 8/1982 | Blanchard ........................... 74/372 |
| 4,505,164 | 3/1985 | Yoshida . |
| 4,662,241 | 5/1987 | Edwards . |
| 4,702,121 | 10/1987 | Hartman .............................. 74/371 |
| 4,716,777 | 1/1988 | Hartman .............................. 74/372 |
| 4,779,475 | 10/1988 | Irikura et al. . |
| 4,858,739 | 8/1989 | Nemoto . |
| 4,966,574 | 10/1990 | von Kaler et al. . |
| 5,030,179 | 7/1991 | Ganoung ............................ 74/333 |
| 5,063,794 | 11/1991 | von Kaler . |
| 5,094,121 | 3/1992 | von Kaler . |

FOREIGN PATENT DOCUMENTS

| | | |
|---|---|---|
| 0079176 | 10/1982 | European Pat. Off. . |
| 1037278 | 8/1958 | Germany ............................ 74/372 |
| 1919008 | 10/1970 | Germany . |
| 3037990 | 5/1982 | Germany . |
| 439345 | 9/1948 | Italy .................................. 74/372 |
| 20127 | 12/1906 | United Kingdom .................. 74/372 |
| 566411 | 12/1944 | United Kingdom . |

Primary Examiner—John J. Vrablik
Attorney, Agent, or Firm—Snow, Christensen & Martineau

[57] ABSTRACT

A transmission apparatus for changing the speed of a driven member relative to the speed of a driving member without interrupting the torque transfer between the members. The apparatus includes reducing gears driven by a driving member, annular cam gears in continuous engagement with the reducing gears, and a driven member which journals the cam gears for rotation. One section of the driven member is hollow and has a plurality of radially extending apertures each containing a reciprocating detent for engaging an inner cam surface or a corresponding cam gear. A shift member mounts within the bore of the driven member and moves along the rotational axis of the driven member to cause the detents to reciprocate between a cam gear engaged position and a disengaged position. By timing the movement of the shift member and the design of the cam surfaces on the cam gear, one cam gear can be simultaneously engaged while another is being disengaged to produce a gear ratio change without interrupting torque transfer between the driving and driven members.

2 Claims, 9 Drawing Sheets

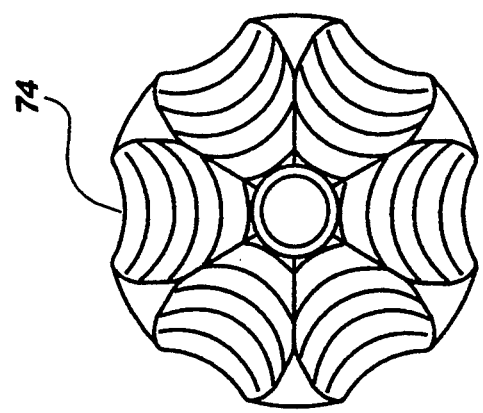
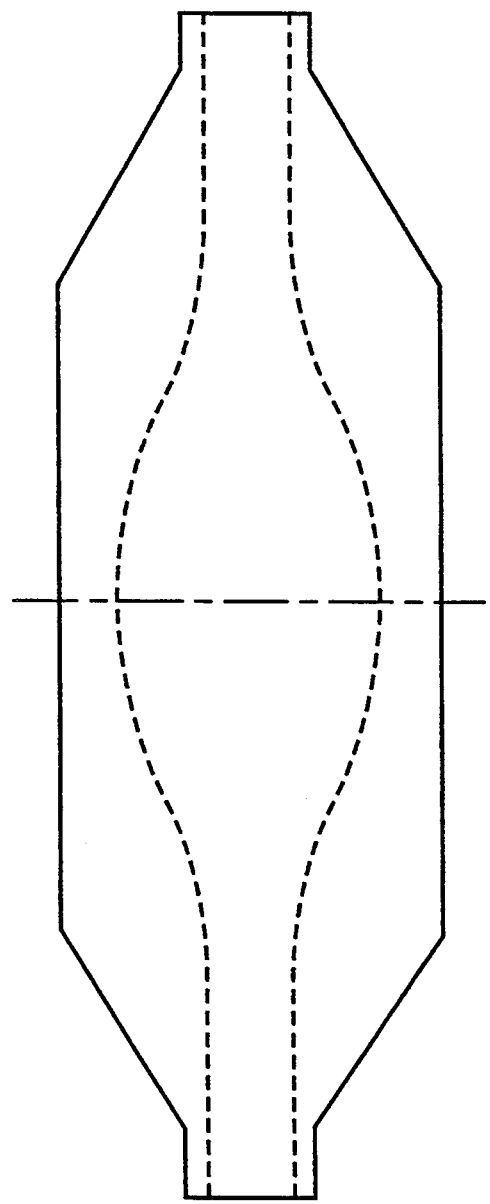
*Fig. 5*
*Fig. 6*

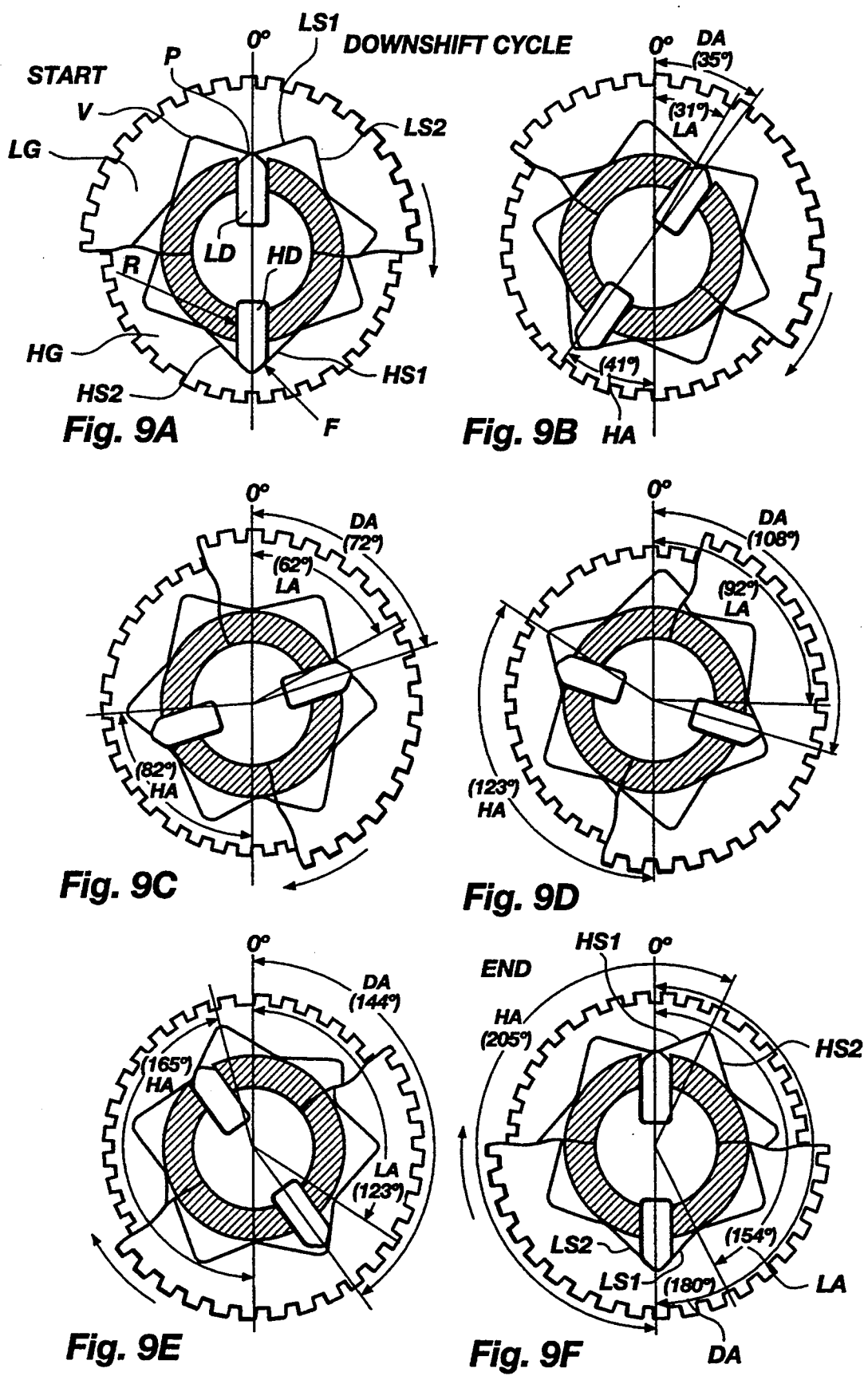

CLUTCHLESS MECHANICAL GEAR TRANSMISSION

TECHNICAL FIELD OF THE INVENTION

The present invention is directed to a new and improved method of changing a gear ratio without the necessity of disengaging a torque from the system.

BACKGROUND OF THE INVENTION

For many years the changing of gear ratios in a mechanical device has been accomplished by disengaging the torque usually with a clutch.

Attempts have been made to force engagement with random selection, but this required a complete disengagement of the torque.

Different non-mechanical designs have been used for the purpose of changing the ratio with continuous torque. One is a double pulley arrangement that drives a V-belt, and constructed of metal elements. This is presently used in snowmobiles.

An other design uses rolling elements between an inner input and an outer output gear arranged much like an epicyclic gear train. The rolling elements can continuously change the gear ratio but they are torque-limited because they rely on the coefficient of static friction to transmit forces between the rolling elements.

DISCLOSURE OF THE INVENTION

Power can be applied to either end of the mechanism depending upon the application. In a bicycle application, power begins at the bike peddle and travels down the crank arm to the crank. The crank is affixed to a drive plate. Usually three or more ring gears on the drive plate are associated with and engaged to each of three or more cam gears. The drive plate by means of the ring gears transfers power to the cam gears. Three steel ball bearings (detents) are locked into the cam valley of the cam gear by means of a shifting bullet. This allows power to transfer from the cam gear through the detents to the drum. Power is then transferred from a drum through the drive gear to the outer sprocket. A chain then delivers power to a rear wheel.

Shifting

A shift occurs when the center of the bullet is moved along its axis from the center of one active cam gear to the center of the cam gear desired, and by means of tapered ends on its leading and trailing ends, it allows the active set of detents to drop from their cam valleys and release the active cam gear, while simultaneously wedging a new set of detents from their peaks to the locked position of their valleys. The shift is initiated when the valley of the active gear is in the same position of rotation along its axis as the peak of the gear is being shifted into. Therefore the position of the cam gears must be timed and consistently relative to each other in order to initiate predetermined and uninterrupted shifting.

If we were to divide the movement of the bullet along its axis into 10 equal positions which represent the shift of one gear, then in the 0 and 10 positions the active gear is locked into engagement and the adjacent higher and lower output gear detents would be free of engagement. In position 1 the active output gear is 10% of the way to being disengaged while the output gear being shifted into is 10% of the way to being engaged. In position 2 the active output gear is 20% of the way to being disengaged while the output gear being shifted into is 20% of the way to being engaged and so forth until position 10 when the active gear becomes inactive and the gear being shifted into becomes the new active gear. During the left sequence positions 1 through 9 there are two gears with different ratios in partial engagement at the same time. No matter how fast the two gears are rotating, the shift is accomplished by their relationship to each other and that is influenced by their difference in ratio. Close ratios can allow relatively long periods of time to complete the shift. In some circumstances the shift could take several revolutions of the output gear to complete. The drum rotation is determined by the detent and during shifting represents a compromise between the active gear rotation and the rotation of the gear being shifted into.

Timing

Shifting can only be initiated when a valley of one cam gear and the peak of the cam gear desired are in the shift start position of rotation. Therefore shifting must be timed, predeterminable, and consistent. The valley and the peak must line up for the purpose of initiating the shift at the same place every time. This is accomplished by making the circumferences of the cam gears and the circumferences of the ring gears and the number of the peaks inside the cam gears all relative to each other.

The marked point on the drive plate at which a cam valley is perpendicular is called "0". The shift initiating starts with reference to a input drive plate and can be engineered for various intervals.

Cam gears are of equal diameter and a number one cam gear is being rotated by a smallest number one ring gear. For every rotation of the drive plate the number one cam gear must rotate at least one time. If it rotates a fraction more than once, the fraction must be devisable of the number of cams in the gear. For example, if the cam gear has six valleys, the additional rotation must be at least one-sixth of a rotation or sixty degrees more than one revolution. This rule applies for each consecutive cam gear. The number two cam must travel at least one-sixth, one-third, one-half, two-thirds, five-sixths, one, and one and one-sixth etc., more than the number one cam. The different amounts of increase in rotation of the cam gears and the number of the cams all effect the intervals at which the shift can take place.

To increase the rotation of the number two cam gear in relation to the number 1 cam gear more circumference is added to the number two ring gear so that the number two cam gear will have to travel a distance equal to the number one cam gear plus the value equal to at least the devisable of the number of cams in the cam gear. When the two shifting intervals are desired in one rotation, the increase must be equal to the full divisible of two. With the one-third increase of the number two cam gear the peak of the number two cam gear and the valley of the number one cam will gear consistently and invariably line up at the 0 and 180 marks. Note: the number one gear valleys, the number two gear peaks, the number three gear valleys and so forth line up at the 0 and 180 marks. The detents line up to determine the start of the shift sequence. They line up differently when the apertures in the drum are offset.

The cam gears and the number one ring gear both have equal circumferences. If we add for example one-sixth more circumference to the number two ring gear, it will rotate one-sixth more. This will allow the shift interval to be initiated at the same reference point on the drive plate every time. An increase of the circumference is proportionally equal to an increase of the radius. Provided with these measurements, the peak and the valley of the adjoining cam gears would line up on rotation at predetermined points, thus, timed shifting can be initiated.

The invention includes a wide variety of variables, the number of the peaks and the valleys in the cam gear and the ratios desired can all be manipulated to accomplish the task for which it is intended.

A lever convenient to a rider is connected to one end of a push-pull cable. At the other end, the cable is connected to one end of the bullet positioning mechanism. The shift shaft is connected to the bullet, which engages the desired gear as it disengages from the active gear. A timing cam is located on the drive plate to time and activate the shift mechanism at the appropriate timed interval.

Basic In-Line Arrangement

The transmission consists of the two shafts. Each shaft has a group of gears which are centered on the shaft and arranged next to each other along the axis of the shaft. One of the shafts has the gears permanently attached to the shaft, either machined from the same bullet or bolted to the shaft. For the purpose of this discussion, this shaft will be referred to as the input shaft (though either can be input). The gears on the other shaft are capable of being locked to the shaft via an arrangement of cams and locks. This shaft will be referred to as the output shaft in this discussion.

The two shafts and their gears are sized and arranged such that when the two shafts are placed in their restraints (bearings), the gear on the input shaft engages the gear on the output shaft and the gear on the output shaft engages the gear on the input shaft.

Each pair of gears, that is, one gear on the input shaft and one gear on the output shaft has a different gear ratio than the adjacent pair of gears. In general, each pair of gears has a different gear ratio than every other pair of gears in that particular transmission. Also, the gear ratios increase in one direction along the shaft and decrease in the other direction.

Power Flow

As stated above all of the gear pairs are engaged. However, only one of the gears on the output shaft is locked to the output shaft via the cams and the locks for that gear set. Power transmits through the transmission via the one locked gear.

Power flow characteristics (speed and torque), through the transmission, can be changed by changing the gear that is locked to the output shaft.

Output Assembly Components

The output assembly is composed of the following pieces of hardware:

1. A plurality of cam gears each of which is shaped like flat donuts where an outer surface is the gear teeth profile and a hole consists of a continuous cam surface consisting of repeating segments cut into an inner diameter of the gear. Each segment of the cam surface is in general composed of three sections which form a V or U shaped valley into which the detent can be inserted. The peak created between the valleys is identified as one of the three sections. A side section of the valleys are steep enough that when the detent is inserted into the valleys and held there by the underlying bullet structure, which is connected to the shift shaft, the gear and the output shaft are locked together. One cam valley can be cut into each gear, preferably at least two, and more preferably three to six depending upon the application. The profile of the cam sections can be shaped to influence the characteristics of a shifting sequence. There are many variables that are available depending upon the application. For example, in the six cam design, where rotations differ by one third for every rotation of the input shaft, the cams can be divided into two sets. One set will line up on the zero mark and the other set will line up on the one eighty mark. The set can have surfaces with their own profiles to perform function for upshifting uphill and downhill and another set for downshifting uphill and downhill.

2. An output shaft includes a hollow cylinder (drum) whose outer diameter is sized to fit inside the inner diameter of the gears with a sliding oil tolerance fit. The guide apertures contain the detents (locking elements, generally two or more to correspond with the number of valleys in the cam surface) that are balls or dogs and the tops are shaped to engage the cam surface. The detents may include a variety of shapes; rounded, triangular, preferably the shape conforming to the cam valley and maximizing the surface to surface contact area. The detent is also designed in such a way as to direct as much as possible a vector force into the drums rotation and not radially into the bullet. The guide apertures are cut in the output shaft and a group of the guide apertures (generally two or more) are positioned such the guide apertures are directly underneath each gear that is fitted over the output shaft.

If desired the drum can be designed into the input shaft. The design provides a different input and output ratios and the rules of interaction between the principle components are the same in either application.

3. A plurality of detents each of which is a metal ball, a pin, a rectangular cube or the like with tops to correspond with the cams, and sides that slide in and out of the guide aperture cut in the output shaft and a bottom to correspond to the grove in the bullet. In some applications the cam and the detent arrangement is so configured as to minimize the forces acting upon the bullet and direct as much as possible the forces acting upon the wall of the aperture of the drum. Basically the steeper the angle of the detent top and corresponding the cam surface the more force is directed into the drum. The detent and cam tolerances along with a orifice in the detent, control oil movement for the purpose of lubricating and dampening the shift.

4. A bullet which is a cylindrical piece that fits inside the inner diameter of the output shaft which has contoured grooves cut in the outer surface to receive the bottom of the detent. The bottom of the groove in the bullet is the cam surface which can be designed to control (along with the shape of the cam surface on the inner diameter of the output gear) the characteristics of the shifting sequence. The bullet is connected to and maneuvered by a screw shaft. Generally the bullet is designed to move with the natural flow of the forces created by the movement of the cams in the active output gear to the inactive gear, but the movement of the bullet can so be delayed or advanced so as to manipulate the output gear and direct the movement of the detents to mesh through the transfer of the varying gear ratios. The bullet is not limited to the number of cams to equal the number of detents. The bullet can be rotated in its angular relationship inside the drum to utilize the set of cam surfaces for the upshift and rotate back for the set of cam surfaces for the downshift. The bullet cam surfaces can be in line as in (FIG. 5) or the bullet cam surfaces can follow a corkscrew configuration.

5. A bullet positioning mechanism to control and to change a position of the bullet generally by means of the screw shaft. This can be accomplished in a variety of ways such as a mechanical lever, a mechanical advantage with gears, an electrical motor, an electrical solenoid, a pneumatic mechanism, etc. All the positioning mechanisms must function with response to timing and magnitude. The bullet positioning mechanism can also be timed in conjunction with a torque sensing device.

Shifting Sequence

The following terms are defined to simplify the description of the shifting sequence:

The active gear pair means the pair of gears that are currently transmitting power;

The Up Shift means a change in the active gear pair such that the ratio of the input to the output is a numerically smaller number, for example, the shift from the gear ratio (input to output) of 5 to a gear ratio of 4; and, The Down Shift means a change in the active gear pair such that the ratio of the input to the output is a numerically larger number, for example, the shift from the gear ratio (input to output) of 4 to a gear ratio of 5.

The shifting sequence is the result of the configuration of the cam surfaces and the arrangement of the components that constitute the output shaft and its associated mechanism to change the output gear that is locked to the output shaft.

The description of the shifting sequence will start with the transmission rotating and the active gear pair being a gear pair that is in the mid-range of the transmission. That is, the transmission is operating in the gear such that it can be either Up Shifted or Down Shifted. The power flow enters through the input shaft and is modified in speed and in torque by the gear ratio of the active gear pair.

The active gear pair is locked to the output shaft because the bullet has been positioned under the detent for that gear hence, forcing the gear up into one of the open spaces formed by the cam valleys that are cut into the inner surface of the gear. The detents are held in position up against the cam surface by the bullet. Therefore, the gear and the output shaft are locked together.

All of the other detent for the gear pairs, other than the active gear pair, are not being held in position against the cam surface of their respective gears by the underlying bullet and therefore any force acting between the detent and the cam surface has a radial component which will drive the detent inward radially and hence the non-active output gears are free to rotate relative to the output shaft.

The non-active gear pairs adjacent to the active gear pair have gear ratios that are different than that of the active gear pair. Therefore, the output gear on the output shaft that is adjacent to the active output gear is moving relative to the active output gear. The output gear is also moving relative to the output shaft inside of it, that is all of the output gears that are non-active are moving relative to the output shaft and the detents are retracted into the aperture of the drum of the output shaft. The magnitude to the relative motion depends on the difference in the gear ratio of the active and the non-active output gears. The relative motion causes the valleys of the cam surfaces in the output gears and the retracted detents in the output shaft to periodically coincide or line up. When the valleys of the cam surfaces and the detent for either of the output gears adjacent to the active gear pairs line up then the shift can occur. Or more accurately, as the cam valleys and the detent for either output gear adjacent to the active gear pair approach coincidence, the shift sequence can start. The engaged detent of the active output gear must be allowed to retract in order for the shift to take place. This is accomplished by the timed synchronous movement of the bullet.

Down Shifting

A down shift requires that the adjacent gear pair which has a higher numerical gear ratio be engaged substantially simultaneously while disengaging the active gear pair. Because the to-be-engaged gear pair has a larger numerical gear ratio, the gear on the output shaft is rotating at a lower rate than the output shaft inside of its inner diameter; and hence, the detent in the output shaft inside the output gear are rotating faster than the gear itself and will, after a certain angle of rotation, be moveable into the position required to be fully engaged. Therefore, when the detent in the output shaft which is matched for the gear to be shifted into is at the peak of the cam surface cut in the inner surface of the gear, the shifting sequence starts. The sequence is controlled by the bullet. At the start of the sequence, the bullet begins to move toward the gear pair to be engaged. This movement accomplishes the following: 1) The detent for the to-be-engaged gear pair starts to move out into the space created by the valley of the cam profile, and 2) the bullet moves out from under the active gear pair and allows the forces between the detent, the cam surface and the output gear to force the detent radially inward into the aperture in the output shaft.

During the disengagement of the active gear pair, that is, while the detent is withdrawing it is still in contact with the cam surface for the active gear pair, the side of the hole in the output shaft, and the bullet and is still transmitting torque. As this detent is being withdrawn, the detent for the to-be-engaged gear pair is being forced radially outward against the cam surface of the to-be-engaged gear. When the active gear pair detent is moved radially inward and off the cam surface and into the circular inner surface of the drum and is no longer locking its gear to the output shaft the to-be-engaged detent is in contact with the cam surface the hole in the output shaft and the bullet and locks its gear to the output shaft. The shift is now complete.

The different amounts of rotation of the input and output shafts that occurs during the shifting process is determined by the difference in the gear ratios of the two gear pair involved in the gear shift. The shifting sequence is controlled by the bullet. The bullet must be moved out from under the detents of the active gear pair to allow the driving force on the detent to drive it inward and, at the same time, the bullet must push the detents of the to-be-engaged gear pair outward into contact with the cam surface for that gear pair. The shape of the cam surface on the bullet, the cam surface on the gear and the shape of the detent all influence the characteristics of the shift and are selected to provide a smooth transition between adjacent gear ratios.

For a downshift, the output shaft will start to slow immediately when the shift sequence starts. This is because the detent starts to withdraw, and as it does so, it slides inwardly along the cam surface such that the corresponding gear around the output shaft rotates more than the output shaft. This different output rotation rate continues to change until the to-be-engaged detent reaches the fully inserted position where it locks its gear to the output shaft, at which point, the output shaft rotation rate will be that determined by the now-active gear pair gear ratio. For a Down Shift the final output shaft rotation rate will be lower than the rotation rate before the shift.

In the start position or the zero mark the resistance alone and with out the aid of rotation, could with the force at FS1 complete a shift by riding the cam surface SS3 if FS1 were larger than SS3. A longer smoother method is to make the FS1 smaller than SS3 and allow for a shift along SS1.

Up Shifting

An up shift requires that the adjacent gear pair which has a smaller numerical gear ratio be engaged simultaneously while disengaging the active gear pair. The up shift is similar to the down shift except that the gear on the other side of the active gear pair is the one to be engaged and the output gear for the to-be-engaged gear pair is rotating faster than the output shaft. Further, because the to-be-engaged gear pair is rotating faster than the output shaft the detent approach their respective cam surfaces from the opposite side as compared to a down shift. That is, the detent for the to-be-engaged gear pair will slide down the opposite side section of the V or U shaped cam surface. For an Up Shift, the output shaft will start to slow immediately when the shift sequence starts. This is because the detent starts to withdraw and as it does so, it slides inwardly along the cam surface such that the corresponding gear around the output shaft rotates more than the output shaft. This difference in output rotation rates continues to change until the to-be-engaged detent reaches the fully inserted position where it locks its gear to the output shaft at which point the output shaft rotation rate will be that determined by the now active gear pair gear ratio. For an Up Shift the final output shaft rotation rate will be higher than the rotation rate before the shift.

BRIEF DESCRIPTION OF THE DRAWINGS

The invention may be further understood from consideration of the detailed description below taken in conjunction with the accompanying drawings in which:

FIG. 5 is a end view of the bullet.

FIG. 6 is a side view of the bullet.

FIGS. 9A to 9F represent a pictorial example of the relationship between the cam gears cam surfaces, the detents and the drum in an downshift cycle.

DETAILED DESCRIPTION OF THE INVENTION

Figure 1:
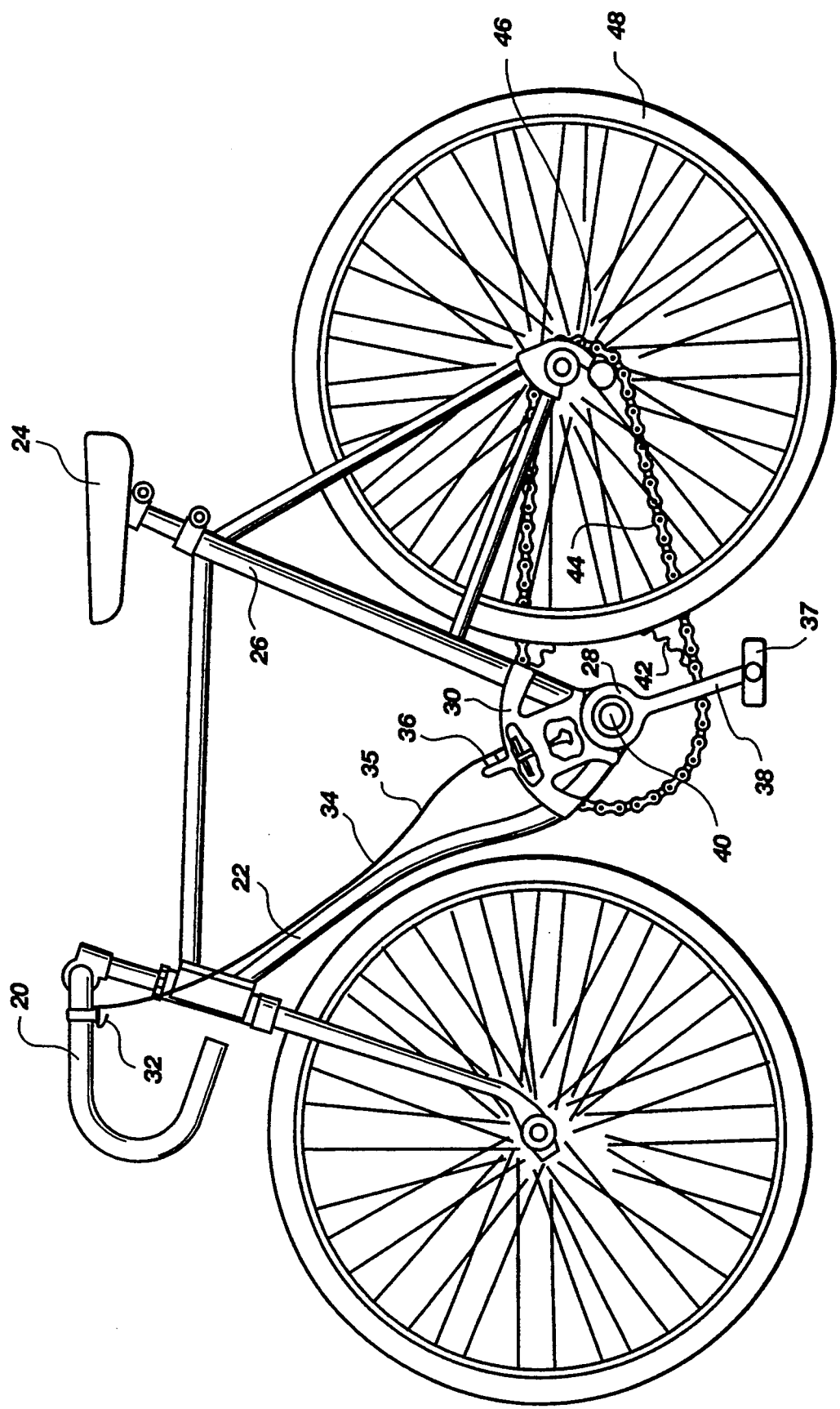
FIG. 1 is a diagrammatic side elevation view of a men's bicycle provided with a gear shifting mechanism according to the invention.

FIG. 1 shows a diagrammatic side elevation view of a men's bicycle with handle bars 20 on top of a down tube 22 and a seat 24 on top of a seat tube 26. At the crank housing 28 between the down tube and the seat tube, and mounted to the seat tube and down tube, is a gear change mechanism housing 30 according to the invention. Attached to the handle bars is a push pull type shift lever 32. Attached to the lever, and running along and down the down tube to the gear change mechanism is a push pull cable 34 with in a sheath 35. The sheath is supported by a support 36.

A peddle 37 is attached to the radially outward end of a crank arm 38. The crank arm is affixed to and rotates a crank shaft 40. The crank shaft drives the gear change mechanism.

The gear change mechanism drives a chain sprocket 42, which drives the chain 44, which rotates the rear sprocket 46, which turns the rear wheel 48.

Figure 2:
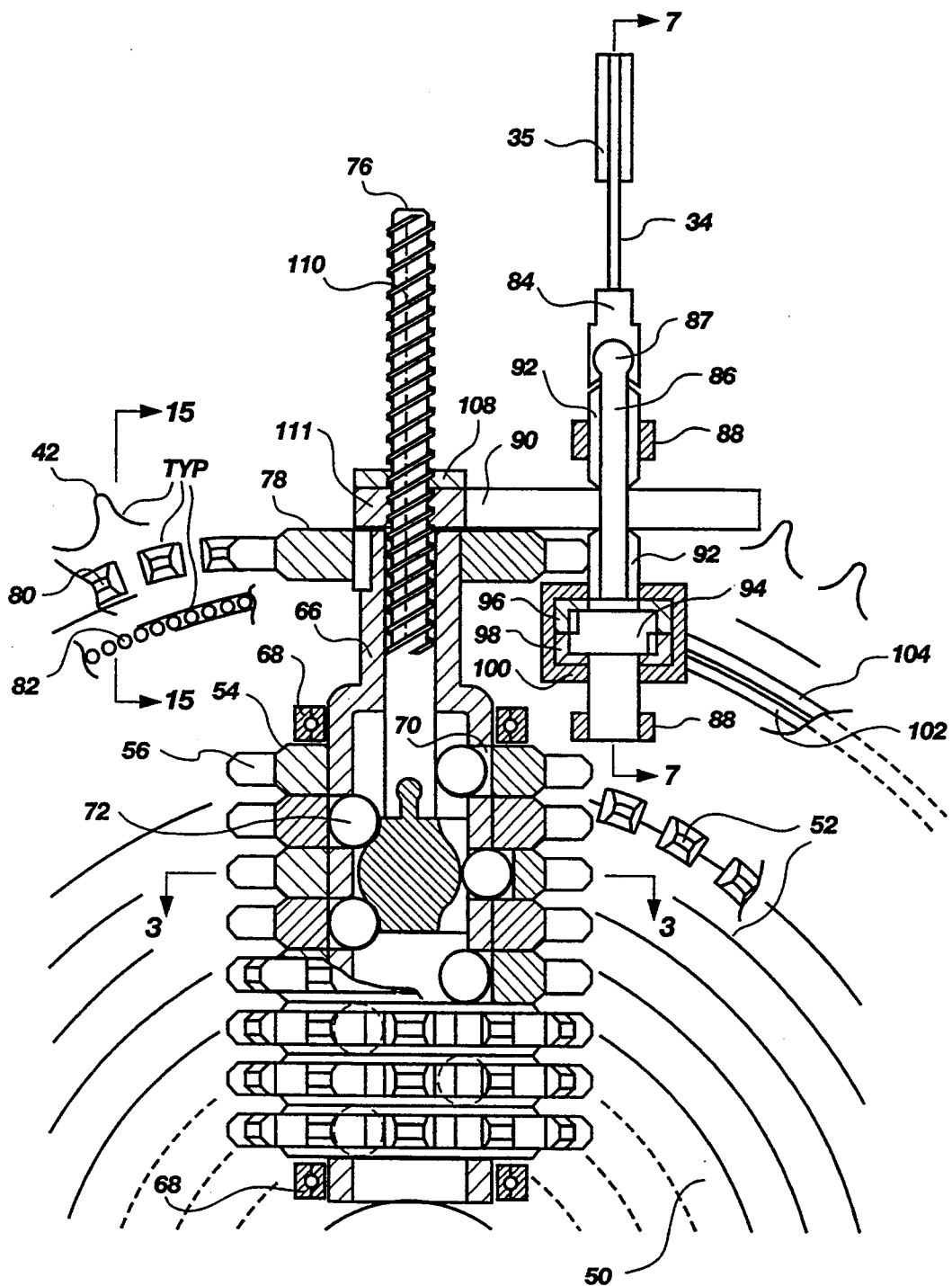
FIG. 2 is a diagrammatic side elevation and cross sectional view of the gear shifting mechanism according to the invention.

FIG. 2 shows a diagrammatic side elevation and cross sectional view of the gear changing mechanism. The crank shaft 40 is affixed to the drive plate 50. A series of eight ring gears 52 with varying circumferences are affixed to the drive plate. The eight ring gears contact and engage each of eight cam gears 54 by means of uniform gear teeth on the ring gears and identical matching teeth 56 on the outer circumference of the cam gears. The cam gears are typical spur gears with six uniform cams 58 (FIG. 3) on their inner circumferences. The cams are comprised of three separate surfaces; a peak 60, a surface 62, and a valley 64. The peaks define the inner circumference of the cam gear, and it is upon these peaks and the sides of the gears that the cam gears rotate around the outer circumference of a drum 66. The drum is mounted at both ends for rotation, by bearings 68. The bearings also retain the cam gears in their lateral position along their axis. The drum is hollow with three apertures 70 corresponding to each of the eight cam gears. The apertures extend from the inner drum surface to the outer drum surface. Each of twenty four drum apertures correspond to a detent 72. The inward bottom surface of the detents come in contact with a bullet. The bullet is mounted within the drum such that it has reciprocal axial movement back and forth along the drum axis. The bullet contains six outer cam surfaces 74 (FIG. 5), each having a central portion extending radially upon which the detents ride. The axial movement of the bullet is regulated by a screw shaft 76. Keyed to the narrow extension of the drum is a drive gear 78. The drive gear is a spur gear with the same outer tooth profile as the cam gears. The drive gear continuously engages a ring gear 80 similar to the ring gears 52. The ring gear 80 is affixed to an outer drive sprocket. The outer drive sprocket rotates independently of the drive plate and it fits over the outside circumference of the drive plate on both sides forming a "U" shape. The bottom of the "U" hold small ball bearings 82 which ride the outer edge of the plate. The legs of the "U" shape extend inward, past the outside circumference of the drive plate.

The push pull cable 34 is connected to a female configured cable end 84. The cable end is attached to a shift actuator shaft 86 at a male ball end 87. The shift actuator shaft is supported so as to provide axial rotation and reciprocal axial movement along its axis by bushings 88 which are attached to the housing. As the shift actuator shaft is pushed or pulled along its axis it engages a shift actuator gear 90 by means of fixed keys 92 on opposite sides of its circumference. The shift actuator gear has a keyway to receive the keys of the shift actuator shaft. The shift actuator shaft includes an actuator pinion 94. When the shift actuator shaft is moved on its axis the pinion moves an upshift rack 96 and a down shift rack 98 referred to as shift racks. The shift racks are contained by a rack housing 100. The rack housing allows reciprocal lateral movement of the shift racks from the plate and by means of a keyway 102 (FIG. 8) on its sides allows the shift racks to move laterally along the shift actuator shaft axis. In the pushed position of the cable the downshift rack and its roller moves over and in line with the downshift cam 200 which is affixed to the surface of the drive plate. In the pull position of the cable the upshift rack and roller move over and in line with the upshift cam 104 which runs parallel to the downshift cam around the drive plate. The shift racks are returned to their neutral position by a rack spring 106. The shift actuator gear has teeth on its outer circumference that engage the teeth of a shift collar 111. The center hole of the shift collar is threaded to receive the screw shaft 76. The screw shaft is held from rotating along its axis by a screw shaft washer guide 108. The screw shaft washer guide is bolted to the housing and has a key built into its inner circumference that slides in a slot 110 in the screw shaft. (shown as hidden lines in FIG. 2)

The peddle transfers torque through the crank arm to the crank, which rotates the drive plate. The ring gears rotate all the cam gears but only the cam gear which is directly over the bullet has engaged detents and transfers torque. The locked detents transfer torque from the cam surface of the cam gear to the drum at the aperture wall. The drum then rotates the drive gear, which rotates the outer sprocket, which drives the chain, which rotates the rear sprocket, which rotates the rear wheel.

Figure 8:
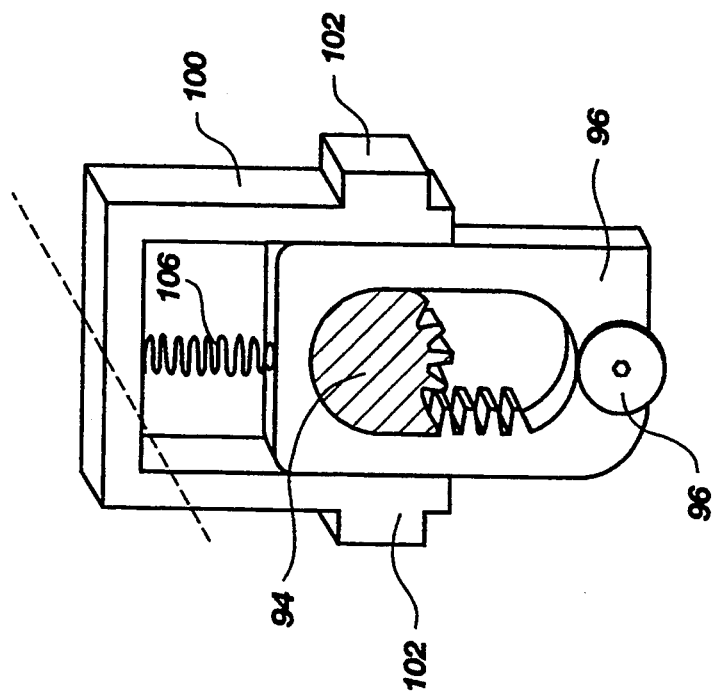
FIG. 8 is a cross sectional perspective view of the shift control mechanism.

A downshift is initiated by pushing the lever on the handle bars, this pushes the cable inward toward the crank, which pushes the shift actuator shaft inward simultaneously engaging the shift actuator gear and moving the rack housing inward and the downshift rack over the downshift cam. The down shift cam can temporarily delay the inward movement of the downshift rack if it is not at its low point. The downshift cam pushes the downshift rack away from the plate causing its gears to engage the gears of the pinion. FIG. 8 shows the upshift rack, the downshift racks teeth are on the opposite side and cause the pinion to rotate counter clockwise. The shift actuator shaft rotates in the same direction as its pinion and causes the screw shaft collar to rotate in such a ways as to force the screw shaft inward. This causes the bullet to begin traveling inward. As the bullet begins to move inward it releases the detents from its valley and along its cam surface while simultaneously lifting the detents of the adjacent lower gear. An upshift is initiated by pulling the lever which pulls the cable, which pulls the shift actuator shaft, which locks the shift actuator gear and lines up the upshift rack over the upshift cam. The cam lifts the upshift rack away from the plate and causes it to engage the pinion. The pinion rotates clockwise which rotates the shift actuator gear clockwise, which rotates the screw shaft collar in such a way as to cause the screw to move outward and engage the adjacent higher gear. The placement and duration of the upshift and downshift cam is predetermined for the purposes of timing.

Figure 3:
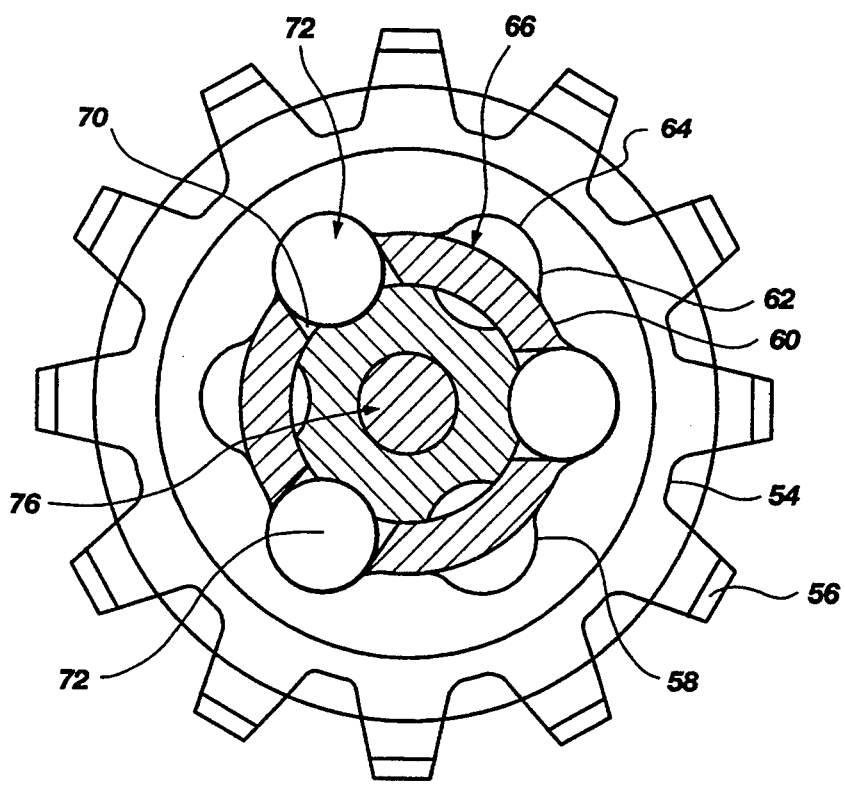
FIG. 3 is a cross sectional view of a six valley cam gear.
Figure 4:
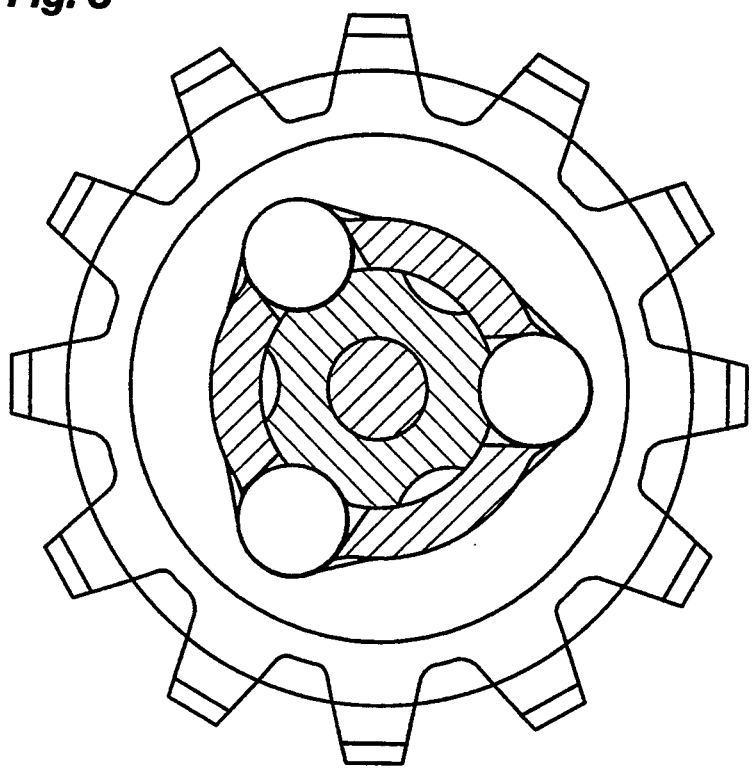
FIG. 4 is a cross sectional view a the three valley cam gear.

FIG. 4 shows the cross sectional view of a cam gear with three cams verses six cams in FIG. 3.

FIG. 5 shows the end view of the bullet. Contour lines show the varying amounts of line contact between the detent and the bullet.

FIG. 6 shows the side view of the bullet. For clarity only the top and bottom cams are shown by hidden lines.

Figure 7:
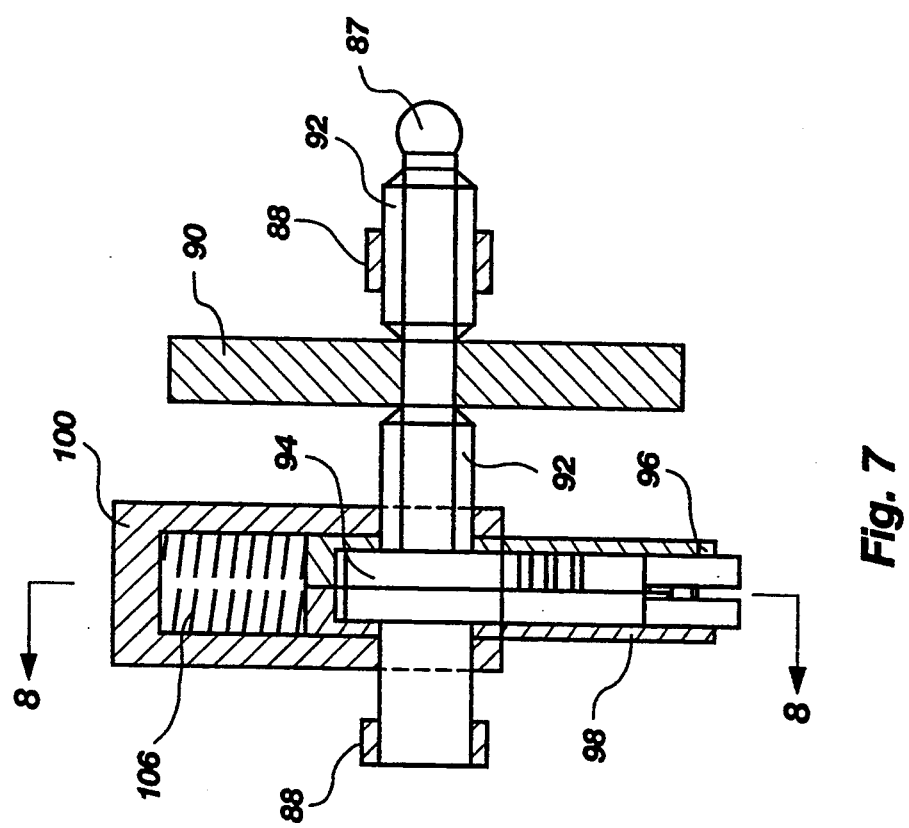
FIG. 7 is a cross sectional view of the shift control mechanism.
Figure 10A:
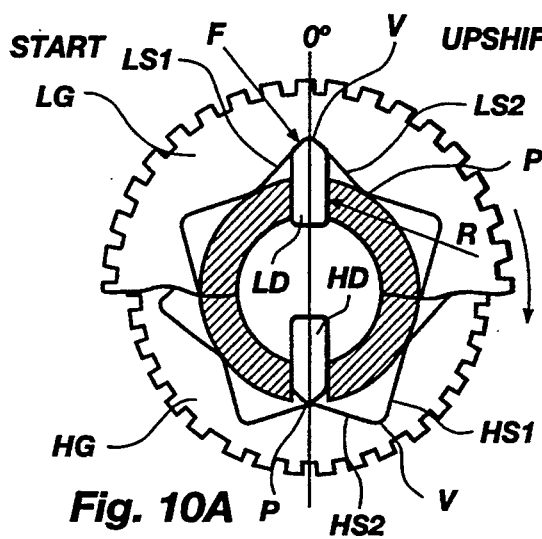
FIGS. 10A TO 10F represent a pictorial example of the relationship between the cam gears cam surfaces, the detents and the drum is an upshift cycle.
Figure 10B:
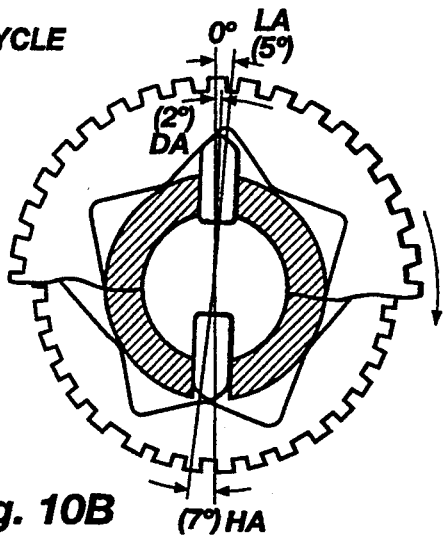
Figure 10C:
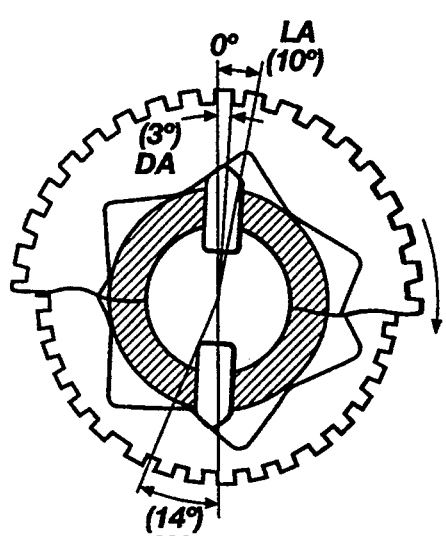
Figure 10D:
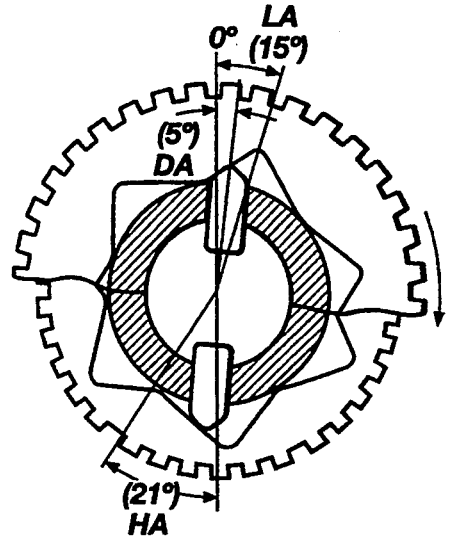
Figure 10E:
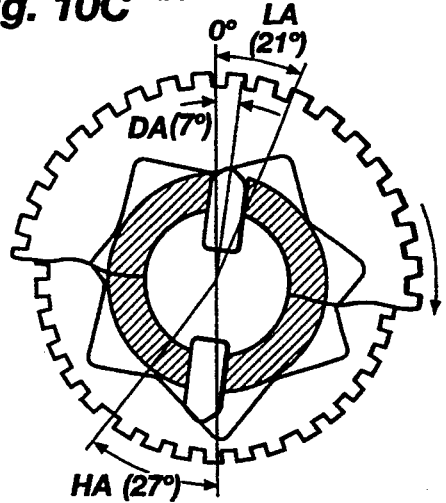
Figure 10F:
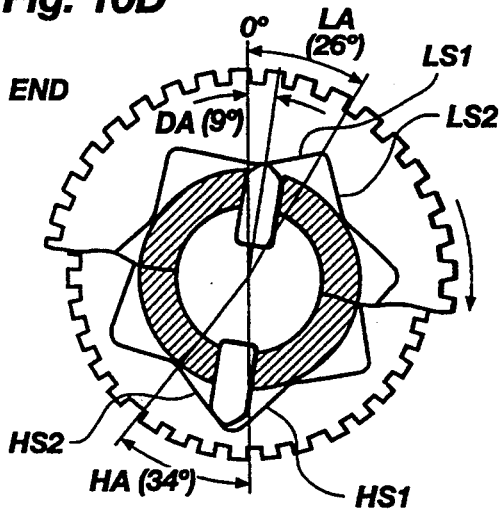

FIG. 7 & 8 are sectional views and are explained in connection with FIG. 2.

Figure 11:
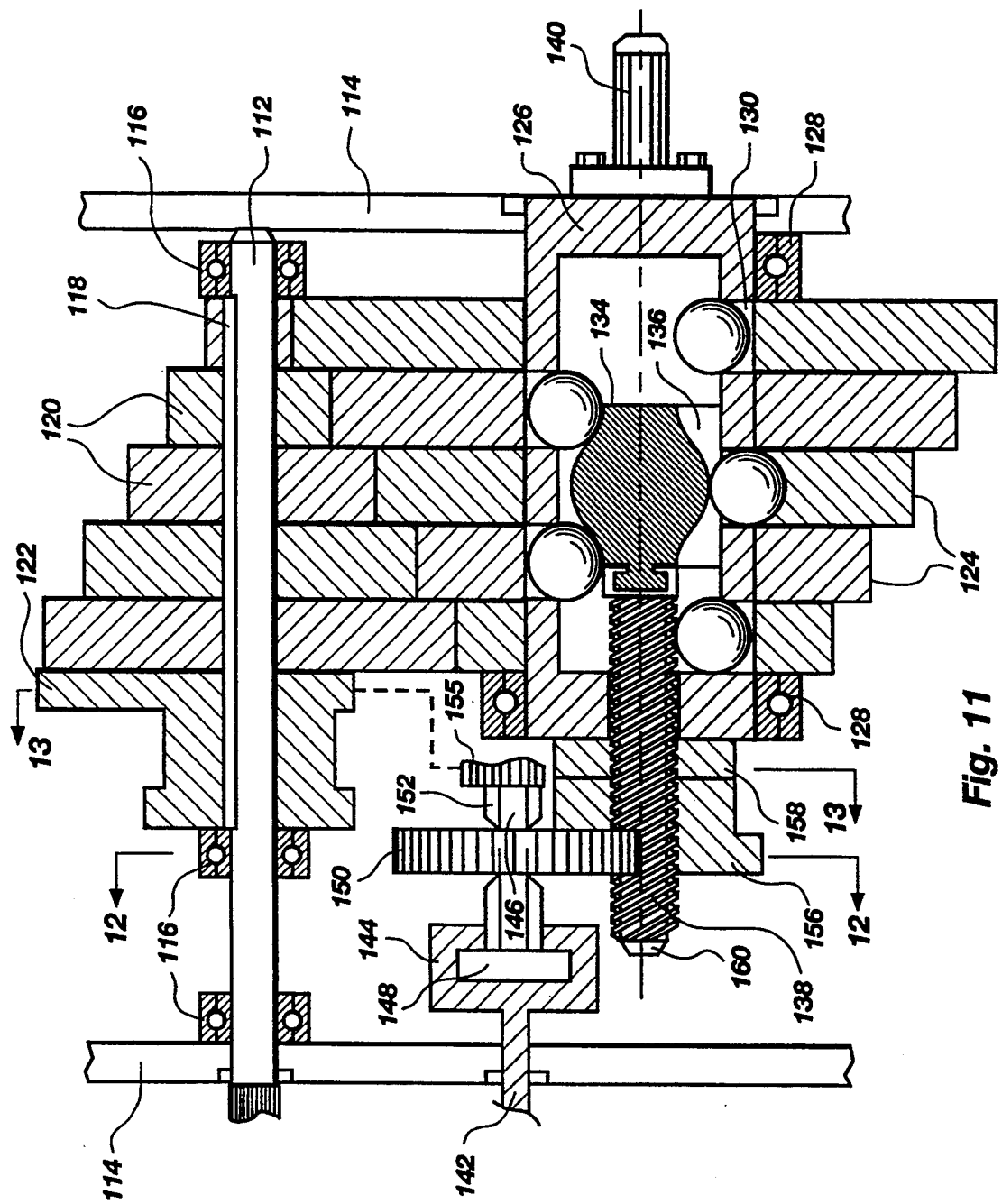
FIG. 11 is a cross sectional view of the in-line transmission.
Figure 12:
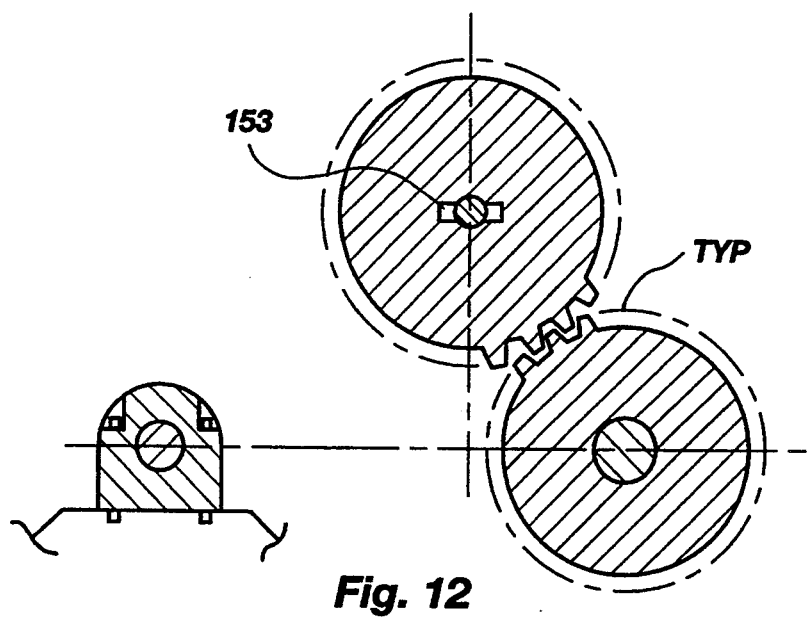
FIG. 12 is a cross sectional view of the shift shaft drive gears and there relationship to the end view of FIG. 11.

FIG. 9 & 10 pictorially represents the actual relationship of the cams, detents, and drums in there respective rotations and movements. Different detents and cam surfaces from FIGS. 2 and 11 are included as examples of varying applications, though the angles and relative movements apply. FIG. 9 is the low to high ration 6 or downshifting cycle.

The object of a shift is to release a set of detents from the cam valleys of one output gear, while simultaneously engaging a set into the cam valleys of an adjacent output gear. This exchange of engaged output gears effects the varying rotational outputs.

Initially, in a downshift, the drum portion of the output shaft is locked to and rotating with the faster rotating output gear, due to the engaged detents. The disengaged detents inside the to-be-engaged slower rotating output gear are rotating faster than the slower gear. The force "F" and the resistance "R" push the "HD" (HIGH SPEED OUTPUT GEAR DETENT) radially inward sliding it along (HIGH SPEED OUTPUT GEAR CAM SURFACE #1) "HS1" releasing it from the faster rotating gear. Simultaneously, the "LD" (LOW SPEED OUTPUT GEAR CAM SURFACE #1), by means of the bullet, is forced radially outward and slides down "LS1" until it reaches the valley "V". The "HD" will slide in just as fast as "LS1" will let the "LD" slide out. This movement is synchronized by the travel speed and cam surfaces of the bullet. As "LS1" and the bullet allow the "LD" to move out, the bullet is allowed to move along its axis, which allows the "HD" to move in, which slows down the drum rotation, which all simultaneously slows down how fast the "LD" moves out. All of this simultaneous movement effects the output drum rotation and the number of degrees the input must rotate to complete a shift. (All the gear rotations are fixed and are referenced to the input shaft rotation.) The forces "F" and resistance "R" relationship at "HS1" and its peak "P" move the "HD"

all the way in and along with the simultaneous movement of the bullet, move the "LD" all the way out, to complete a shift. The shift is complete when the "HS1" peak (P) is in the same position of rotation as the "LS1" valley (V).

The ability to predetermine the lining up of peaks and valleys for the purpose of initiating a shift is a product of, and timed with reference to, the angular rotation of the input shaft or drive plate. If the slower speed output gear (cam gear) travels X degrees of the input shaft, then, the higher speed output gear travels X+YX degrees of the input shaft. Y is a variable parameter determined by the ratio between gear pairs. If gears travel at the same velocity there isn't a potential for creating a shift. It is the difference between gear ratios and the angular measurement of the cam surfaces arc that determine the shift interval. (X+YX)−X represents the difference between output gears. When the downshift involves HS1 and LS1 the difference in rotation must allow for the full angular arc of HS1 and LS1. Hence (X+YX)−X=HS1+LS1.

Low to high shift or upshift. FIG. 10. Initially, the drum portion of the output shaft is rotating with the low gear by means of the engaged "LD". The drum portion of the output shaft and the disengaged "HD" rotates slower than the high gear. The force "F" and the resistance "R" push the "LD" inward sliding it along "LS1" and releasing it from the low gear. In the upshift cycle the resistance performs most of the movement required for the shift. The active cam surfaces HS2 and LS1 of the gears fall in the path of this negative drum rotation. If detent HD were not considered, the force and resistance alone at the slower gear would move the drum equal to the arc angle of LS1. If HS2 equals LS1 no rotational difference would be required between SG and FG. But if LS1 and HS2 were equal the shift would have to finish the instant it started, So it is important for HS2 to be larger than LS1 to allow time to shift. There are many manipulations that can be done to change this out come, one of which is modification of the bullet. So as indicated the resistance at LS1 is responsible for moving the bullet the arc angle equal to LS1. The difference between HS2 and LS1 must be provided by the difference between SG and FG.

In the upshift the detents travel negative with respect to their respective gears. The differences of all cam surfaces must be such a relationship so as to allow for the bullet to remain symmetrical. Otherwise a more sophisticated version of the bullet must be implemented.

FIG. 11 shows a diagrammatic side cross sectional view of the in-line transmission version of a gear shifting mechanism according to the invention. A input shaft 112 is splined at one end on the outside of a transmission housing 114 and mounted inside the housing by a set of three bearings 116 to the housing. The bearings provide the input shaft axial rotation and no lateral movement. The shaft runs through the center and is locked by a key 118 to five input (spur) gears 120 of varying circumferences and a shift cam 122. Each of the five input gears are permanently engaged by means of a gear tooth profile on there outer circumference to five output (cam) gears 124. The output gears are typical spur gears with six uniform cams 58 (FIG. 3) on there inner circumferences. The cams are comprised of three separate surfaces; a peak 60, a surface 62, and a valley 64. (FIG. 3) The peaks define the inner circumference of the output gear, and it is upon these peaks that the output gears rotate around the outer circumference of a drum portion of a output shaft 126. The drum is mounted at both ends for rotation, by bearings 128. The bearings also retain the output gears in there lateral position along their axis. The drum is hollow with three apertures 130 corresponding to each of the five output gears. The apertures extend from the inner drum surface to the outer drum surface. Each of fifteen drum apertures correspond to a detent 132. The inward bottom surface of the detents come in contact with a bullet 134. The bullet is mounted within the drum such that it has reciprocal axial movement back and forth along the drum axis. The bullet contains six outer cam surfaces 136 each having a central portion extending radially upon which the detents ride. The axial movement of the bullet is regulated by a screw shaft 138. Bolted to the other end of the drum is a output spline 140.

Figure 13:
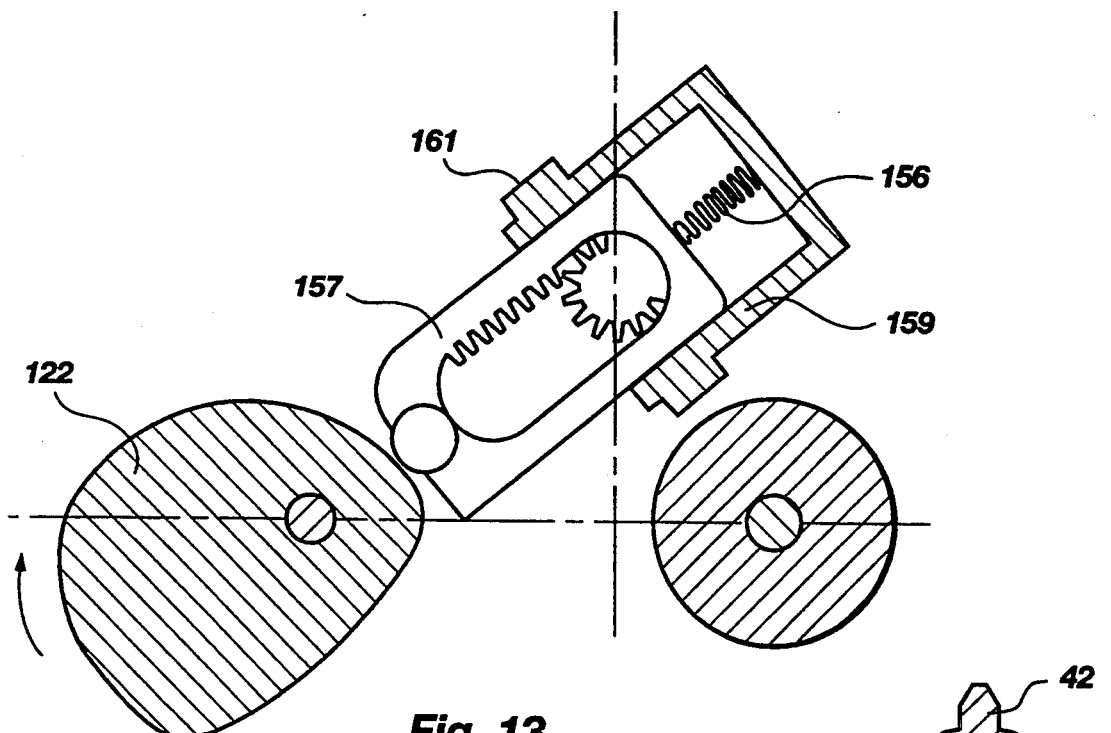
FIG. 13 is a cross sectional view of the shifting mechanism and the downshift cam and there relationship to the shift shaft actuating collar.
Figure 14:
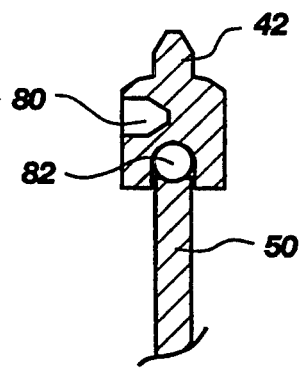
FIG. 14 is cross-sectional view of the outside edge of the plate and the outer drive sprocket.

The gear shift lever is connected to the female portion of a union joint 144 by means of a connecting rod 142. The union end is attached to a shift actuator shaft 146 at a male union end 148. The shift actuator shaft is supported so as to provide axial rotation and reciprocal axial movement along its axis by bushings (FIG. 7 #88) which are attached to the housing. As the shift actuator shaft is pushed or pulled along its axis it engages a shift actuator gear 150 by means of fixed keys 152 on opposite sides of its circumference. The shift actuator gear has keyways 153 to receive the keys of the shift actuator shaft. The shift actuator shaft includes a actuator pinion 155. When the shift actuator shaft is moved on its axis the pinion moves an upshift rack 157 and a down shift rack referred to as shift racks. The shift racks are contained by a rack housing 159. The rack housing allows reciprocal lateral movement of the shift racks from the plate and by means of a keyway 161 (FIG. 13) on its sides allows the shift racks to move laterally along the shift actuator shaft axis. In the inward movement of the union the downshift rack and its roller moves over and in line with a downshift portion 122 of the shift cam which is affixed to the input shaft. In the pull position of the union the upshift rack and roller move over and in line with a upshift cam portion 154 of the shift cam which runs parallel to the downshift cam portion around the shift cam.

The placement and configuration of these shift cams can be advanced or retarded, to vary which cam surface is used for engagement. A robust design of the shifting mechanism can overcome if necessary the "F" and "R" to engage a detent. This option can be used to lengthen the ratio change transition. The shift racks are returned to there neutral position by a rack spring 156. The shift actuator gear has teeth on its outer circumference that engage the teeth of a shift collar 202. The center hole of the shift collar is threaded to receive the screw shaft 138. The screw shaft is held from rotating along its axis by a screw shaft washer guide 158. The screw shaft washer guide is bolted to the housing and has a key built into its inner circumference that slides in a slot 160 in the screw shaft. (shown as hidden lines in FIG. 11).

What is claimed is:

1. A transmission apparatus for changing the speed of a driven member relative to the speed of a driving member, said apparatus comprising:
   a plurality of reducing gears;
   driving means for causing said reducing gears to move in response to movement of said driving member;
   a plurality of annular cam gears each in continuous driving engagement with a corresponding one of said reducing gears, each of said cam gears having an inner cam surface with at least one peak and at least one, valley;

a hollow drum mounted for rotation about an axis and having a plurality of apertures extending from an inner drum surface to an outer drum surface, at least one of said apertures corresponding to each of said cam gears, and said cam gears being mounted for rotation about said outer drum surface with said inner cam surface opposite to said at least one corresponding aperture;

a plurality of detents, one corresponding to each of said drum apertures and each arranged for reciprocating radial movement within its corresponding drum aperture;

a cam member mounted within said drum for reciprocal axial movement back and forth along said drum axis, said cam member comprising an outer cam surface having a central portion extending radially for respectively engaging said detents to hold the engaged detent in a first position at which it engages the valley of the corresponding cam gear, end portions on either side of said central portion for allowing the engaged detent to move into a second position out of engagement with the peak of the corresponding cam gear, and intermediate portions on either side of said central portion for causing said detentes to reciprocate between said first and second positions in response to axial movement of said cam member; and, actuating means for selectively moving said cam member in either axial direction relative to said drum so as to cause a selected detent to engage the valley of its corresponding cam gear such that a driving connection is made between said driving member and said driven member through said engaged cam gear, the inner cam surface of said cam gears and the outer cam surface of said cam member being contoured relative to each other to time the axial movement of said cam member such that said axial movement may commence only about when the peak of a cam gear to be disengaged from its corresponding detent is substantially aligned with the valley of an adjacent cam gear to be engaged by its corresponding detent, and said axial movement may cease only about when the valley of the cam gear to be disengaged is substantially aligned with the peak of the adjacent cam gear to be engaged.

2. A transmission apparatus according to claim 1 which comprises three of said apertures and three of said detents corresponding to each of said cam gears, and wherein the inner cam surfaces of each of said cam gears comprises three of said valleys and three of said peaks.

* * * * *